United States Patent Office.

JOSEPH SMITH, OF SCHODACK CENTRE, NEW YORK.

Letters Patent No. 74,622, dated February 18, 1868.

IMPROVED MEDICAL COMPOUND.

The Schedule referred to in these Letters Patent and making part of the same.

TO ALL WHOM IT MAY CONCERN:

Be it known that I, JOSEPH SMITH, of Schodack Centre, in the county of Rensselaer, and State of New York, have invented a new and improved Medical Compound; and I do hereby declare that the following is a full, clear, and exact description thereof, which will enable others skilled in the art to make and use the same.

This invention relates to a new and improved liniment for the cure of rheumatism, lameness, and various diseases which are attended with inflammation. It is composed of the following ingredients: Cider vinegar, one gallon; acetate of lead, four ounces; spirits of turpentine, two ounces; muriatic acid, two ounces; oil of vitriol, two ounces.

The vinegar is placed in a jug, or other vessel capable of being tightly corked, and the other ingredients added, and, in bottling the compound, the jug or other vessel containing it is repeatedly shaken, in order that the ingredients may be kept in a thoroughly incorporated state, and in applying the compound or liniment, it is necessary, before pouring it out, that the bottle containing be well shaken.

The liniment is applied by simply rubbing it on the affected part of the body. In some cases, a bandage may be saturated with it and applied.

Having described my invention, I claim as new, and desire to secure by Letters Patent—

A medical compound, comprising the ingredients about in the proportions herein set forth.

The above specification of my invention signed by me, this thirtieth day of November, 1867.

JOSEPH SMITH.

Witnesses:
JOSIAH W. BOYCE,
GEORGE ECKES.